United States Patent [19]

Parthasarathy

[11] Patent Number: 4,498,333
[45] Date of Patent: Feb. 12, 1985

[54] CARBON GRANULE PROBE MICROPHONE FOR LEAK DETECTION

[75] Inventor: Shakkottai P. Parthasarathy, Duarte, Calif.

[73] Assignee: The United States of America as represented by the Administrator of the National Aeronautics and Space Administration, Washington, D.C.

[21] Appl. No.: 500,044

[22] Filed: Jun. 1, 1983

[51] Int. Cl.³ ............................................. G01M 3/24
[52] U.S. Cl. .................................... 73/40.5 A; 73/753
[58] Field of Search .................... 73/40.5 A, 592, 753; 179/122, 124, 125, 126, 127, 128, 129, 130; 381/56, 112

[56] References Cited

U.S. PATENT DOCUMENTS

| | | | |
|---|---|---|---|
| 1,296,683 | 3/1919 | Maxfield | 179/122 |
| 1,634,210 | 6/1927 | Reisz | 179/122 |
| 2,171,793 | 2/1937 | Huth | 179/122 |
| 2,548,947 | 4/1951 | Clewell | 367/178 X |
| 3,831,561 | 8/1974 | Yamamoto et al. | 340/605 X |
| 4,309,576 | 1/1981 | Corrigan | 73/592 |

Primary Examiner—Jerry W. Myracle
Assistant Examiner—Hezron E. Williams
Attorney, Agent, or Firm—Paul F. McCaul; Thomas H. Jones; John R. Manning

[57] ABSTRACT

A microphone which is not subject to corrosion is provided by employing carbon granules to sense sound waves. The granules are packed into a ceramic tube and no diaphragm is used. A pair of electrodes are located in the tube adjacent the carbon granules and are coupled to a sensing circuit. Sound waves cause pressure changes on the carbon granules which results in a change in resistance in the electrical path between the electrodes. This change in resistance is detected by the sensing circuit. The microphone is suitable for use as a leak detection probe in recovery boilers, where it provides reliable operation without corrosion problems associated with conventional microphones.

5 Claims, 1 Drawing Figure

CARBON GRANULE PROBE MICROPHONE FOR LEAK DETECTION

ORIGIN OF THE INVENTION

The invention described herein was made in the performance of work under a NASA Contract and is subject to the provisions of Section 305 of the National Aeronautics and Space Act of 1958, Public Law 85-568 (72 STAT 435; 43 USC 2457).

BACKGROUND OF THE INVENTION

1. Field of the Invention

This invention is directed to transducers, and more particularly to transducers for use as leak detection probes in recovery boilers. Small leaks in boiler tubes of recovery boilers eject water or steam at high pressure. Sound produced by these jets have peak frequencies ranging from about 10 KHz for a one millimeter leak to 2 KHz for five millimeter leaks. The noise produced by these jets can be detected above the background low frequency combustion noise of the recovery boiler and used to produce an alarm. Leaks in recovery boilers are dangerous, and it is therefore desirable to have a reliable and rugged device to detect such leaks. The present invention is directed to a system employing carbon granules for leak detection.

2. Description of the Prior Art

In prior art systems, conventional microphones containing a vibrating diaphragm are employed to detect leaks. Because of the harsh atmosphere of the recovery boiler, the diaphragm typically corrodes within several weeks. In addition, the positioning of the microphone is such that some of the high frequency sounds to be detected are considerably attenuated.

Microphone systems employing carbon granules are disclosed in U.S. Pat. Nos. 1,581,334 to Crandell, 2,697,136 to Baker, et al. and 3,859,478 to Cragg, et al. Generally, such microphones operate on the basis of resistance changes in the carbon granules caused by changes in mechanical pressure on the granules. However, prior art microphones employing carbon granules have all included a diaphragm. Therefore, such microphones would be faced with the same problems of corrosion in a recovery boiler atmosphere as conventional microphones.

U.S. Pat. Nos. 3,028,450 to Manning, 3,167,824 to Florer, et al., 3,209,344 to Miller, 3,831,561 to Yamamoto, et al. and 4,309,576 to Corrigan disclose detection systems for water or gas leaks. The patent to Yamamoto is specifically directed to detection of leaks in recovery boilers. None of these patents discloses or suggests the use of a carbon granule microphone.

SUMMARY OF THE INVENTION

It is an object of the present invention to provide a microphone which is not subject to corrosion. It is another object of the present invention to provide such a microphone for use in systems for detecting leaks in boiler tubes. Still another object of the present invention is to provide a sensitive, reliable, low-cost device that can be used in hostile environments such as recovery boilers.

These and other objects are achieved by providing a microphone which employs carbon granules to detect sound waves. The microphone does not include a diaphragm and is therefore not subject to corrosion as are prior art microphones. Broadly, the microphone is formed of a housing within which carbon granules are packed. A pair of electrodes are positioned adjacent the granules and connected to a detection circuit. Sound waves striking the granules cause minute pressure changes, causing the granules to pack and release, thereby resulting in resistance changes in the electrical bath between the electrodes. The detection circuit is employed to detect the resistance changes.

When used in a recovery boiler leak detection system, the housing for the microphone is a small ceramic tube having an open end which is inserted into the recovery boiler hear the locations where leaks are likely to occur and a closed end into which the carbon granules are packed. As small flow of air can be provided to keep dust and fumes out of the tube.

BRIEF DESCRIPTION OF THE DRAWING

The present invention will be described with reference to the accompanying drawing, wherein.

DESCRIPTION OF THE PREFERRED EMBODIMENT

Figure 1:
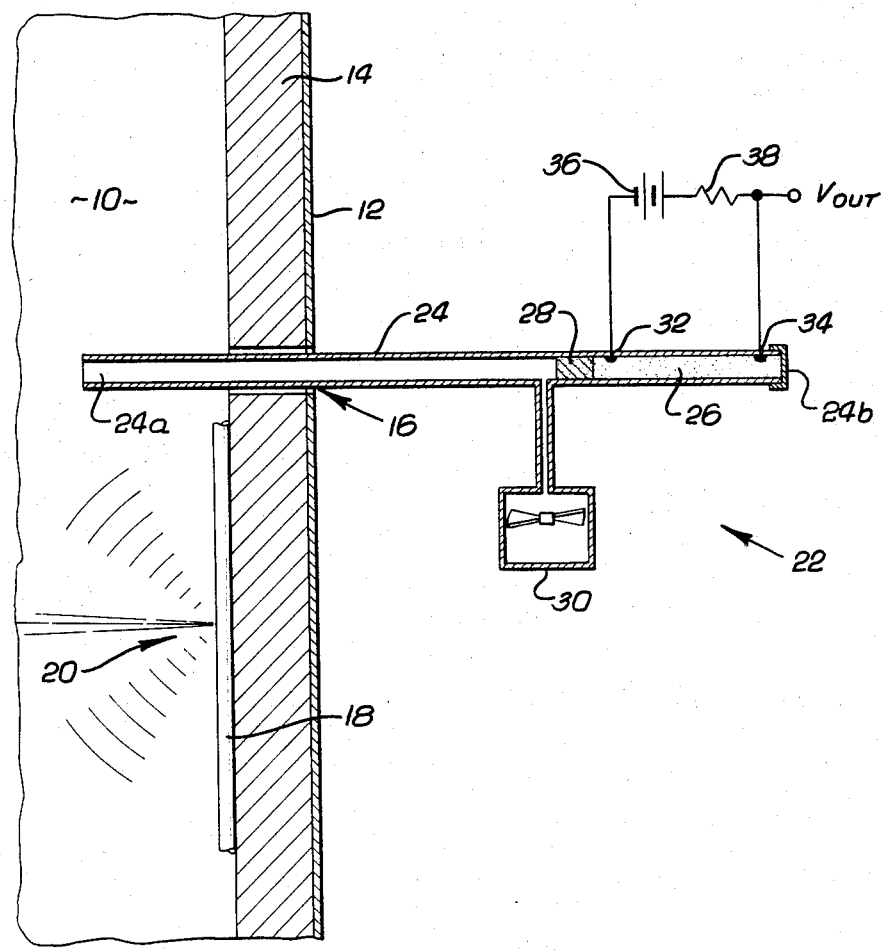
FIG. 1 is a sectional view of a portion of a recovery boiler showing the microphone system of the present invention inserted through the wall of the recovery boiler.

The following description is of the best presently contemplated mode of carrying out the invention. This description is made for the purpose of illustrating the general principles of the invention and is not to be taken in a limiting sense. The scope of the invention is best determined by the appended claims.

Referring to FIG. 1, a recovery boiler 10 includes a wall 12 and a lining 14. An opening 16 is formed through the wall and lining to enable the introduction of the microphone of the present invention to the interior of the recovery boiler. A steam or water tube 18 is located in the interior of the recovery boiler and may develop a small leak 20. The pressurized fluid exiting from the leak 20 emits sound waves whose peak frequencies range from about 10 KHz for a one millimeter leak down to 2 KHz for five millimeter leaks. These leaks are potentially dangerous, and it is therefore desirable to have a reliable method of detecting them. The difficulty of detection is increased due to the presence of low frequency background combustion noise in the recovery boiler.

The present invention is directed to a microphone generally indicated at 22 which is used to detect the high frequency sound waves associated with leaks in the recovery boiler. The microphone 22 is formed of a ceramic tube 24 having an open end 24a which extends into the interior of the recovery boiler, and a closed end 24b which is located on the outside of the recovery boiler. In the present embodiment of the invention, the ceramic tube has an inside diameter of approximately one centimeter. The closed end of the tube is packed with a plurality of carbon granules 26, which are held in place by means of a porous plug 28 which allows the passage of sound waves. Optionally, a blower 30 may be employed to create a small flow of air in the ceramic tube to keep dust and fumes out of the tube. This air flow will additionally attenuate low frequency combustion noise within the tube 24. In addition, the end 24b may be removable to facilitate replacement of the carbon granules.

A pair of electrodes 32 and 34 are located within the tube adjacent the carbon granules at spaced apart locations. A battery 36 and resistor 38 are located outside the tube 24 and are connected in series across the electrodes 32 and 34. In operation, the high frequency sound waves resulting from the leak 20 will enter the open end 24a of the tube and will cause minute pressure changes on the carbon granules. The granules will pack and release in response to the pressure changes, resulting in resistance changes in the electrical path through the granules between the electrodes 32 and 34. These resistance changes will result in voltage changes across the resistor 38 which can be sensed at a terminal $V_{out}$. Thus, the sound waves can be detected by means of a microphone system which does not employ a diaphragm which is subject to corrosion. The carbon granules are inert, and the atmosphere of the recovery boiler will therefore not adversely affect the operation of the microphone.

In summary, the present invention provides a simple, reliable microphone which may be operated as a leak detection probe in recovery boilers. The microphone does not include a diaphragm and is not subject to corrosion problems which have plagued prior art leak detection systems.

We claim:

1. A fluid container system including means for detecting leaks therein, comprising:
   a fluid container;
   a ceramic tube having an open end adapted for insertion into the interior of the container, said tube having a closed end located on the outside of the container;
   a plurality of carbon granules packed within the closed end of the tube;
   a plug contained within the tube for maintaining the carbon granules in their packed condition, said plug allowing the passage of sound waves therethrough; and
   detection means for detecting resistance changes of a fixed length path through the carbon granules resulting from pressure changes on the carbon granules caused by sound waves entering the tube.

2. A system as in claim 1 wherein the detection means includes first and second spaced apart electrodes located in the interior of the housing adjacent the carbon granules and circuit means for detecting resistance changes in the path through the carbon granules between the electrodes.

3. A system as in claim 2 wherein the circuit means comprises a battery and resistor connected in series across the electrodes, wherein changes in the resistance in the path through the carbon granules will result in variation of the voltage across the resistor.

4. A system as in claim 1 including means for providing a flow of air from the interior of the tube to the open end thereof to prevent the entry of dust and fumes into the tube.

5. A system as in claim 1 wherein the container is a recovery boiler.

* * * * *